(12) United States Patent
Tomaru

(10) Patent No.: US 11,079,852 B2
(45) Date of Patent: Aug. 3, 2021

(54) INPUT DEVICE

(71) Applicant: DENSO CORPORATION, Kariya (JP)

(72) Inventor: Tetsuya Tomaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/895,258

(22) Filed: Jun. 8, 2020

(65) Prior Publication Data

US 2020/0301511 A1    Sep. 24, 2020

Related U.S. Application Data

(63) Continuation of application No. PCT/JP2018/040690, filed on Nov. 1, 2018.

(30) Foreign Application Priority Data

Dec. 12, 2017  (JP) .............................. JP2017-237603

(51) Int. Cl.
  *G06F 3/0488*  (2013.01)
  *G06F 3/01*    (2006.01)
  *G05G 1/01*    (2008.04)
  *G05G 5/03*    (2008.04)

(52) U.S. Cl.
  CPC .............. *G06F 3/016* (2013.01); *G05G 1/01* (2013.01); *G05G 5/03* (2013.01); *G06F 3/04883* (2013.01); *G05G 2505/00* (2013.01)

(58) Field of Classification Search
  CPC ....... G06F 3/016; G06F 3/04883; G05G 1/01; G05G 5/03; G05G 2505/00
  See application file for complete search history.

(56) References Cited

U.S. PATENT DOCUMENTS

| 2006/0066559 A1* | 3/2006 | Chui | G09G 3/3466 345/108 |
| 2017/0205882 A1* | 7/2017 | Tanaka | G06F 3/016 |
| 2017/0308169 A1* | 10/2017 | Birnbaum | G06F 3/04883 |

FOREIGN PATENT DOCUMENTS

| JP | 2003058321 A | 2/2003 |
| JP | 2008070983 A | 3/2008 |
| JP | 2017126211 A | 7/2017 |
| JP | 2017130021 A | 7/2017 |
| WO | WO-2019017009 A1 | 1/2019 |
| WO | WO-2019116771 A1 | 6/2019 |

OTHER PUBLICATIONS

U.S. Appl. No. 16/895,501, filed Jun. 8, 2020, Tetsuya Tomaru.
U.S. Appl. No. 16/895,746, filed Jun. 8, 2020, Tetsuya Tomaru.

* cited by examiner

*Primary Examiner* — Robert J Michaud
(74) *Attorney, Agent, or Firm* — Harness, Dickey & Pierce, P.L.C.

(57) ABSTRACT

An input device includes: a detector that detects an operation state of an operation object on an operation surface; a controller that performs an input operation on a predetermined instrument; and a driver that vibrates the operation surface. Multiple operation areas for operating the predetermined instrument are set on the operation surface in advance. The controller applies an attraction action into a second operation area by causing the driver to generate a predetermined vibration in an intermediate area between a first operation area and the second operation area. The controller stops an actuation of the driver.

6 Claims, 10 Drawing Sheets

TACTILE SENSE IMAGE : FEELING OF PASSING OVER PEAK
(i.e., INTENSITY OF VIBRATION APPLIED TO FINGER INCREASES
TO BE MAXIMIZED AT PEAK AND DECREASES TO BE MINIMIZED AT BOTTOM)

INPUT DEVICE

CROSS REFERENCE TO RELATED APPLICATIONS

The present application is a continuation application of International Patent Application No. PCT/JP2018/040690 filed on Nov. 1, 2018, which designated the U.S. and claims the benefit of priority from Japanese Patent Application No. 2017-237603 filed on Dec. 12, 2017. The entire disclosures of all of the above applications are incorporated herein by reference.

TECHNICAL FIELD

The present disclosure relates to an input device that enables an input operation with an operation object such as a finger, such as an operation using a touch pad or a touch panel.

BACKGROUND

An input device of a comparative example is placed at a position different from a position of a display device. The input device includes the touch pad (operation detector) that detects an operation position of the finger on an operation surface, an actuator that controls a frictional force between the finger and the operation surface by vibrating the operation surface based on a detection result of the touch pad, and a controller that controls an actuation of the actuator.

SUMMARY

An input device may include: a detector that may detect an operation state of an operation object on an operation surface; a controller that may perform an input operation on a predetermined instrument; and a driver that may vibrate the operation surface. Multiple operation areas for operating the predetermined instrument may be set on the operation surface in advance. The controller may apply an attraction action into a second operation area by causing the driver to generate a predetermined vibration in an intermediate area between a first operation area and the second operation area. The controller may stop an actuation of the driver.

BRIEF DESCRIPTION OF DRAWINGS

The above features and advantages of the present disclosure will become more apparent from the following detailed description made with reference to the accompanying drawings. In the accompanying drawings.

DETAILED DESCRIPTION

Figure 1:
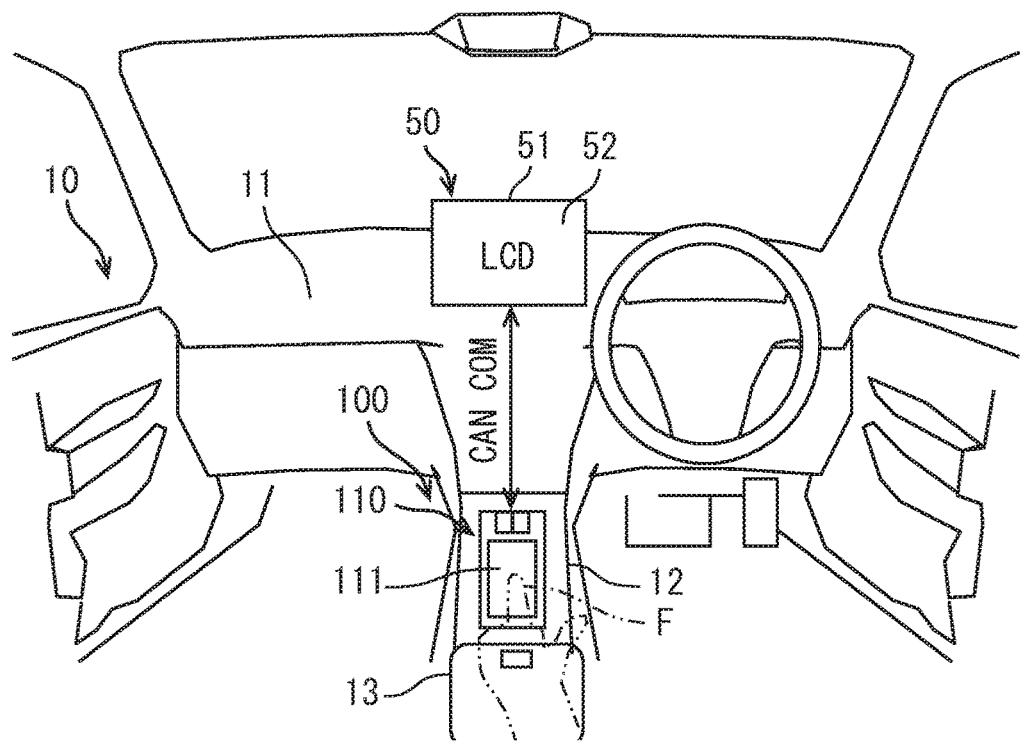
FIG. 1 is an explanatory view showing a mounting state of an input device in a vehicle.
Figure 2:
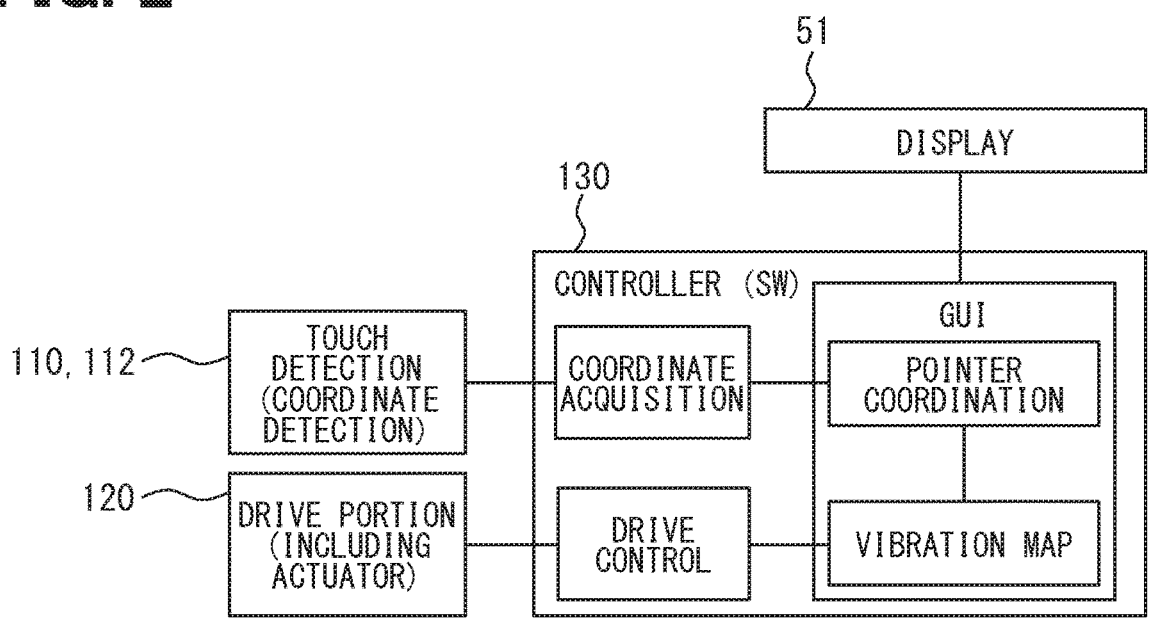
FIG. 2 is a block diagram showing the input device.

An input device as a comparative example is placed at a position different from a position of a display device. The input device includes the touch pad (operation detector) that detects an operation position of the finger on an operation surface, an actuator that controls a frictional force between a finger and an operation surface by vibrating the operation surface based on a detection result of the touch pad, and a controller that controls an actuation of the actuator. The input device enables input to an icon displayed on the display device by performing a finger operation on the icon on the touch pad. The input device may be also referred to as a tactile sense presentation device. The touch pad may be also referred to as an operation detector. The actuator may be also referred to as a vibrator. The icon displayed on the display device may be also referred to as an operation button.

On the touch pad, an area corresponding to the icon of the display device is defined as a target area. An area corresponding to the periphery of the icon is defined as a peripheral area. When the finger moves on the operation surface of the touch pad from an area other than the peripheral area to the target area through the peripheral area, the controller actuates the actuator, and vibration occurs in the peripheral area.

When the finger moves in the area other than the peripheral area, the vibration does not occur and a predetermined frictional force occurs to be applied to the finger. When the finger passes through the peripheral area, a squeeze effect occurs between the finger and the operation surface due to the vibration occurrence. The frictional force of the finger on the operation surface decreases. Then, a movement speed of the finger increases. Furthermore, when the finger moves in a target, the vibration does not occur, and the predetermined frictional force occurs against the finger. When an operator performs the finger operation so that the finger moves from the area other than the peripheral area to the target area through the peripheral area, the frictional force decreases in the peripheral area. A feeling of attracting the finger toward the target area occurs.

The input device provides an attraction action by causing the vibration in the peripheral area on a precondition that the finger continuously moves from the area other than the peripheral area to the target area through the peripheral area. For example, when the movement of the finger is stopped in the peripheral area, the finger simply continues to be vibrated. Therefore, an attraction effect is not achieved, and the operator feels uncomfortable.

One example of the present disclosure provides an input device capable of attracting an operation object towards a movement destination without providing an uncomfortable feeling to an operator.

According to one example embodiment, an input device may include: a detector that may detect an operation state of an operation object on an operation surface; a controller that may perform an input operation on a predetermined instrument in accordance with the operation state detected by the detector; and a driver that may be controlled by the controller and vibrate the operation surface. Multiple operation areas for operating the predetermined instrument may be set on the operation surface in advance. The multiple operation areas may include a first operation area and a second operation area. When determining that, based on the operation state, the operation object moves from the first operation area to the second operation area, the controller may apply an attraction action into the second operation area by causing the driver to generate a predetermined vibration in an intermediate area between the first operation area and the second operation area on the operation surface. The controller may stop an actuation of the driver under a predetermined condition in which a stop of the operation object in the intermediate area may be estimated or when the operation object may pass a predetermined position in the intermediate area. In the input device, the predetermined vibration may be a stationary wave along the operation surface in a movement direction of the operation object. A middle position of the intermediate area may provide a maximum intensity of the predetermined vibration. The predetermined condition may be a condition in which change of a waveform of a generated vibration is not observed for a certain time. Alternatively, in the input device, the predetermined vibration may be a stationary wave along the operation surface in a movement direction of the operation object. A middle position of the intermediate area may provide a maximum intensity of the predetermined vibration. The predetermined position is a position after the intensity may be maximized.

According to one example, the controller stops the actuation of the driver under the predetermined condition in which the stop of the operation object in the intermediate area is supposed. Therefore, it may be possible to prevent the predetermined vibration from repeatedly continuing to be applied to the operation object. It may be possible to prevent the operator from feeling uncomfortable. The controller stops the actuation of the driver when the operation object exceeds the predetermined position in the intermediate area. Therefore, while a certain degree of the attraction action caused by the predetermined vibration is provided, the further vibration is not applied to the operation object. Thereby, it may be possible to prevent the operator from feeling uncomfortable.

First Embodiment

FIGS. 1 to 9 show an input device 100 according to a first embodiment. The input device 100 according to the present embodiment is applied to, for example, a remote operation device for operating a navigation device 50. The input device 100 is mounted in a vehicle 10 with the navigation device 50. The navigation device 50 may correspond to a predetermined instrument of the present disclosure.

The navigation device 50 is a route guidance system showing current position information of the own vehicle on a map, traveling direction information, or guidance information to a destination desired by an operator, or the like.

The navigation device 50 includes a liquid crystal display 51 as a display (display portion). The liquid crystal display 51 is placed in a center part of an instrument panel 11 of the vehicle 10 in a vehicle width direction. A display screen 52 is visually recognized by the operator.

The navigation device 50 is formed separately from the input device 100, and is set at a position away from the input device 100. The navigation device 50 and the input device 100 are connected by, for example, a controller area network bus (CAN bus, registered trademark). As shown in FIG. 1, a CAN communication may be referred to as "CAN COM".

Figure 4:
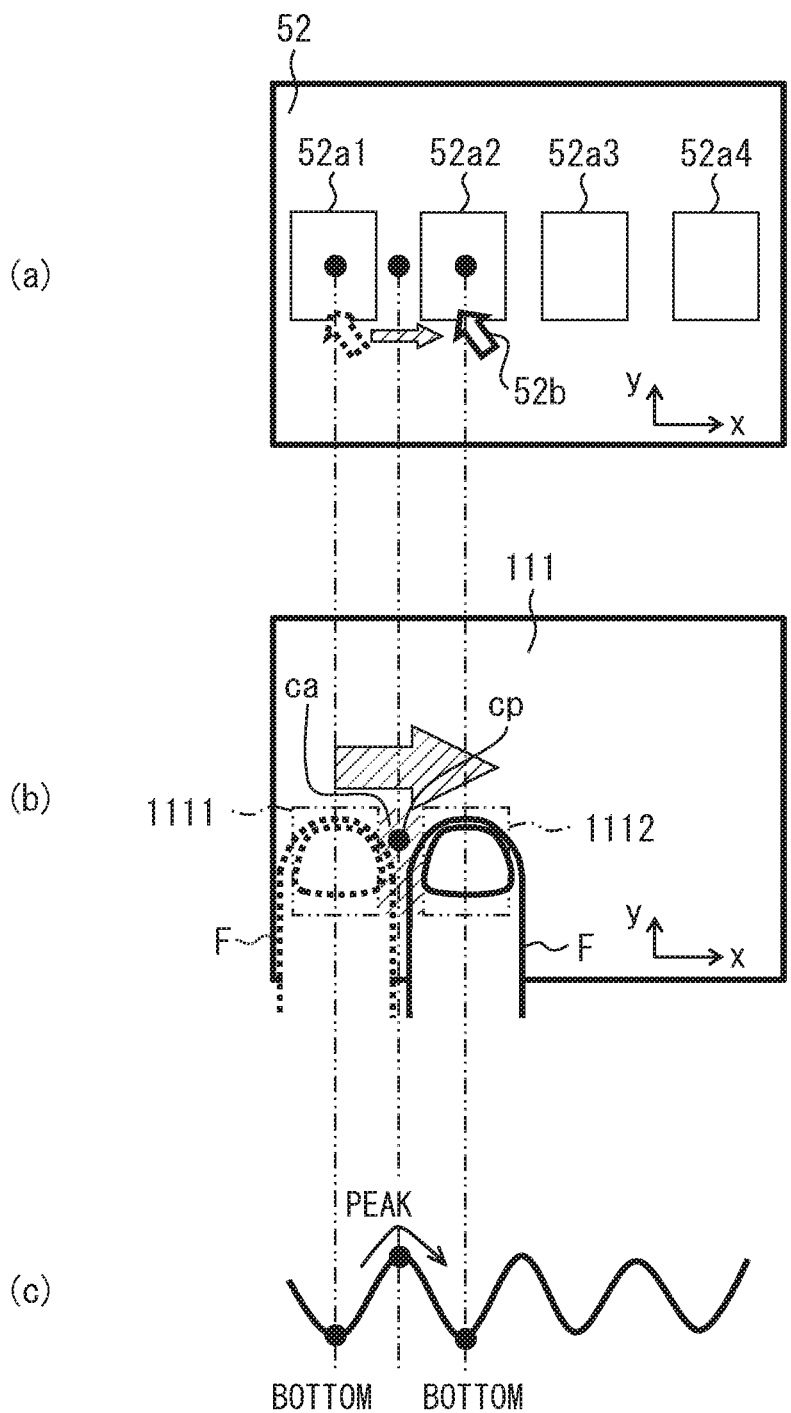
FIG. 4 is an explanatory view showing an operation button, an operation area, an intermediate area, an intermediate position, and an image of an intensity of vibration.
Figure 8:
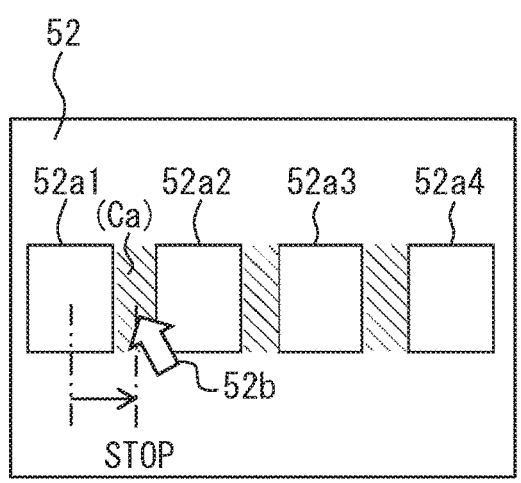
FIG. 8 is an explanatory view showing a situation where a pointer (finger) stops in the middle of an intermediate area.

On the display screen 52 of the liquid crystal display 51, a position of the own vehicle on the map is displayed, and various operation buttons 52a1 to 52a4 for operating the navigation device 50 are displayed (FIGS. 4 and 8). The various operation buttons 52a1 to 52a4 are, for example, buttons for an enlarged display, a reduced display, a destination guidance setting, or the like. The various operation buttons 52a1 to 52a4 are a first operation button 52a1, a second operation button 52a2, a third operation button 52a3, and a fourth operation button 52a4, or the like. The various operation buttons 52a1 to 52a4 may be so-called operation icons. In the display screen 52, for example, a pointer 52b designed in an arrow shape is displayed so as to correspond to a position of a finger F (operation object) of the operator on an operation portion 110 (more specifically, operation surface 111). The finger F of the operator may correspond to one example of the operation object of the present disclosure. The operation surface 111 may correspond to a surface on an operation side of the operation portion.

As shown in FIGS. 1 to 4, the input device 100 is placed at a position adjacent to an armrest 13 in a center console 12 of the vehicle 10. The input device 100 is placed in a range that is easily reached by a hand of the operator. The input device 100 includes the operation portion 110, a driver (drive portion) 120, and a controller 130, or the like.

The operation portion 110 forms a so-called touch pad, and serves as a portion for performing the input operation on the navigation device 50 with the finger F of the operator. The operation portion 110 includes the operation surface 111, a touch sensor 112, and a housing 113 or the like.

The operation surface 111 is exposed to the operator side at the position adjacent to the armrest 13, and is a plane portion on which the operator performs the finger operation. For example, the operation surface 111 is formed by placing a material that improves finger sliding over the entire surface or the like. On the operation surface 111, operation areas respectively corresponding to the various operation buttons 52a1 to 52a4 on the display screen 52 are set in advance. Here, in order to simplify the following description, the operation area corresponding to the first operation button 52a1 is a first operation area 1111. An operation area corresponding to a second operation button 52a2 is a second operation area 1112.

An area between the first operation area 1111 and the second operation area 1112 in the operation surface 111 is defined as an intermediate area ca. Furthermore, a predetermined position (for example, a center position or an arbitrary position in the middle) in the intermediate area ca is defined as an intermediate position cp.

The operation area (each of the operation areas 1111 and 1112, or the like) on the operation surface 111 is set so that input for an operation (selection, pressing decision, or the like) to the various operation buttons 52a1 to 52a4 displayed on the display screen 52 can be performed by the finger operation of the operator. In a circumference of the operation surface 111, a rib 111a extending to a side opposite to the operation side is placed.

The touch sensor 112 is, for example, a capacitance type detector placed on a back side of the operation surface 111. The touch sensor 112 is formed in a rectangular flat plate shape, and detects the operation state of the finger F of the operator on a sensor surface. The touch sensor 112 may correspond to one example of a detector of the present disclosure.

The touch sensor 112 is formed by arranging an electrode extending along an x-axis direction on the operation surface 111 and an electrode extending along a y-axis direction in a grid shape. These electrodes are connected to the controller 130. A generated capacitance of each electrode changes in accordance with the position of the operator finger F approaching the sensor surface. A signal (sensitivity value) of the generated capacitance is output to the controller 130. The sensor surface is covered with an insulation sheet made of an insulation material. The touch sensor 112 is not limited to the capacitance type. Various types such as a pressure sensitive type can be employed.

The housing 113 is a support portion that supports the operation surface 111 and the touch sensor 112. The housing 113 is formed in a frame shape, and, for example, is placed inside the center console 12.

The driver 120 vibrates the operation surface 111 in a surface direction of the operation surface 111, that is, directions of two axes including the x-axis and the y-axis of the operation surface 111. The driver 120 is placed between the rib 111a and the housing 113 at one or more sides. The driver 120 is connected to the controller 130. The controller 130 controls vibration generation.

The driver 120 enables vibration in only one axis direction of the two axis directions, and thereby generates the vibration in one axis direction (x-axis direction or y-axis direction) on the operation surface 111. The driver 120 enables the vibrations in two axis directions, and can generate the vibration on the operation surface 111 in an oblique direction obtained by combining the two vibrations.

Figure 3A:
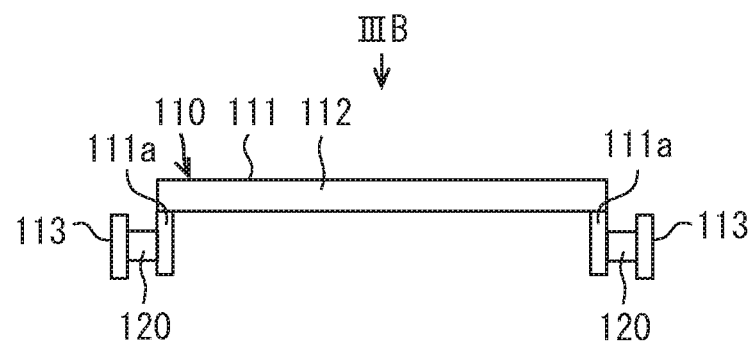
FIG. 3A is a side view showing an operation portion and a driver in a first embodiment.
Figure 3B:
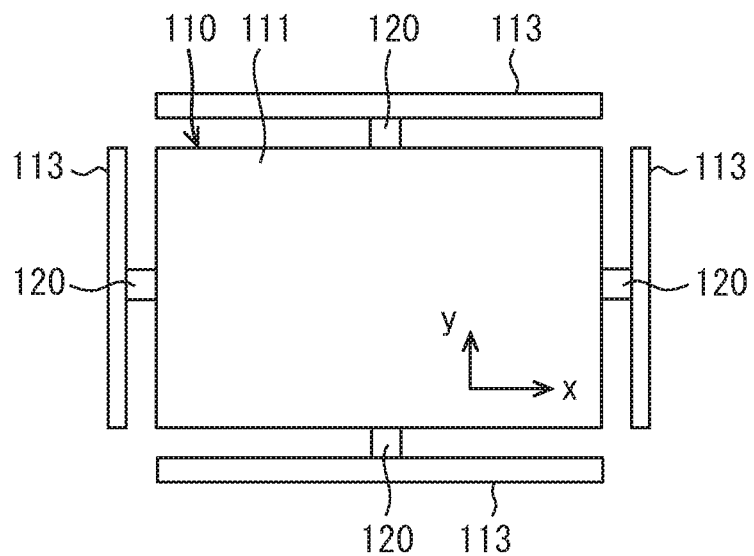
FIG. 3B is a plan view viewed from a direction of an arrow IIIB of FIG. 3A.

As the driver 120, for example, an electromagnetic actuator such as a solenoid or a voice coil motor, a vibrator such as a piezo or a combination of the vibrator or a spring or the like may be employed. For example, when one vibrator generates the vibrations in two axis directions, the driver 120 can be formed by at least placing the one vibrator at one side among the four sides corresponding to the circumference of the operation surface 111. Alternatively, when the vibrator generates the vibration in only one direction, the driver 120 can be formed by arranging the vibrator (two vibrators in total) at each of two sides adjacent to each other corresponding to the circumference of the operation surface 111. Alternatively, when the combination of the vibrator in one direction and the spring is placed at each of two sides, the driver 120 can be formed by placing two sets of the combinations so that the vibration directions intersect. In the present embodiment, as shown in FIGS. 3A and 3B, the driver 120 may correspond to the vibrators placed at the four sides corresponding to the circumference of the operation surface 111.

The controller 130 includes a CPU, a RAM, and a storage medium, or the like. As the operation state of the finger F of the operator, based on a signal obtained from the touch sensor 112, the controller 130 acquires a contact position (contact coordinate) of the finger F on the operation surface 111, a direction from the operation area closest to a area a position contacted by the finger F among the operation areas (1111, 1112 or the like), and a distance from the contacted area to the closest operation area or the like. The controller 130 calculates a coordinate of the pointer 52b on the liquid crystal display 51 based on the acquired contact position of the finger F, and displays the pointer 52b on the liquid crystal display 51. In addition, the controller 130 acquires, as the operation state, the presence or absence of a press operation in any of the operation areas (1111, 1112, or the like) on the operation surface 111.

The controller 130 controls the generation state of the vibration by the driver 120 in accordance with these operation states. A vibration control parameter (vibration map) when the vibration is controlled is stored in the storage medium of the controller 130 in advance. The controller 130 controls the vibration based on this vibration control parameter.

The configuration of the input device 100 according to the present embodiment is as described above, and the actuation and effect will be described below with reference to FIGS. 5 to 9.

Figure 5:
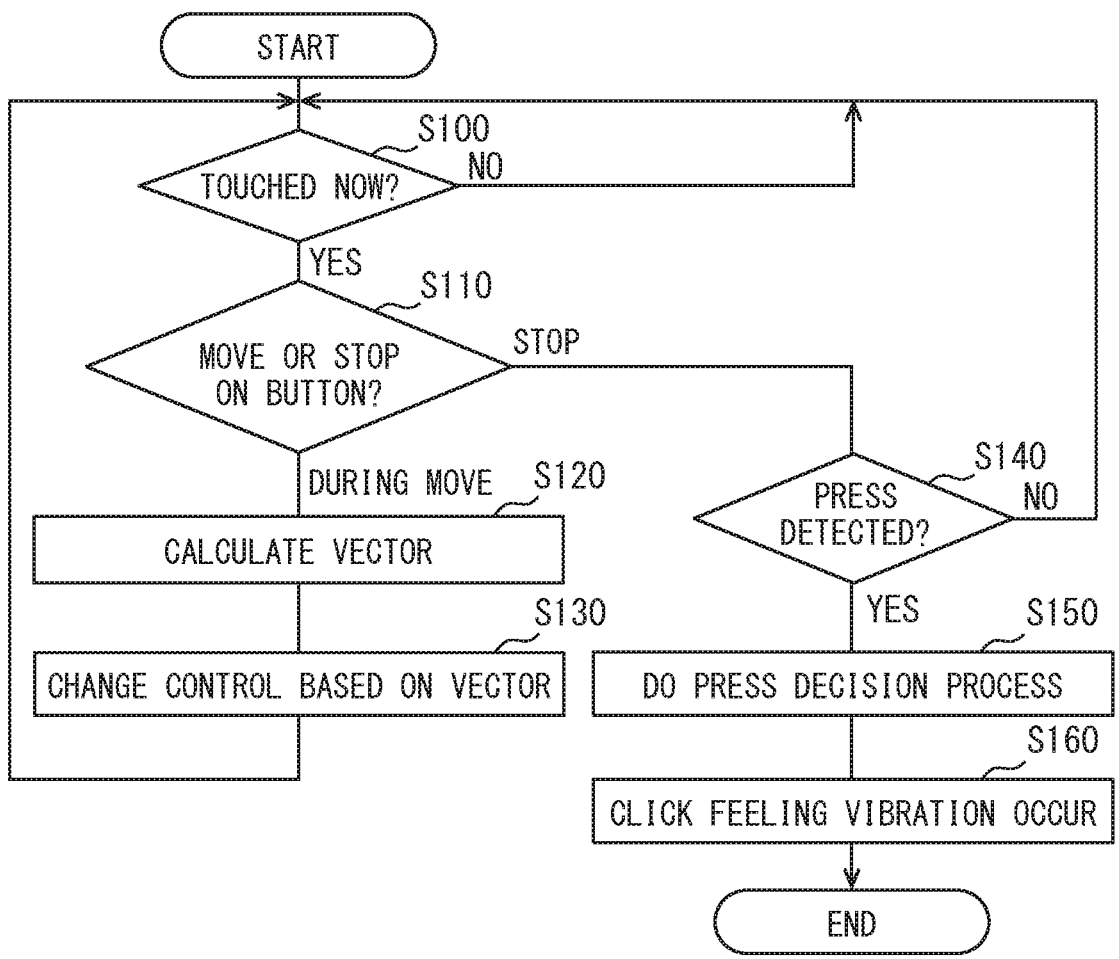
FIG. 5 is a flowchart showing a content of an attraction control by the input device.

The controller 130 performs a control of attracting (pulling) the finger F to the operation area as the movement destination based on a flowchart of FIG. 5. In S100, the controller 130 determines whether the finger F of the operator touches (contacts with) the operation surface 111 based on the signal (operation state of the finger F) obtained from the touch sensor 112. When determining that the finger F does not touch the operation surface 111, the controller 130 repeats the process in S100. When determining that the finger F touches the operation surface 111, the controller 130 shifts to the process in S110. As shown in a part (a) of FIG. 4, when the finger F of the operator touches the operation surface 111, the display of the pointer 52b on the display screen 52 becomes valid, the pointer 52b is displayed on the display screen 52 so as to correspond to the position of the finger F of the operator on the operation surface 111.

Hereinafter, as shown in a part (b) of FIG. 4, a case where the finger F is moved from the first operation area 1111 to the second operation area 1112 will be described as one model.

In S110, the controller 130 determines whether the finger F of the operator moves from the first operation area 1111 (any of the operation areas) among various operation areas 1111 and 1112 to the second operation area 1112 (different operation area) or stops in the first operation area 1111. When determining that the finger F moves, the controller 130 proceeds to S120. When determining that the finger F stops, the controller 130 proceeds to S140.

In S120, the controller 130 calculates a vector between the current first operation area 1111 (current position of the pointer 52b) and the closest second operation area 1112. In the vector calculation, the controller 130 calculates a distance (length of the vector) between the first operation area 1111 (position of the pointer 52b) and the second operation area 1112, and a direction (direction of the vector) from the first operation area 1111 (position of the pointer 52) to the second operation area 1112.

In S130, in accordance with the vector (length and direction), the controller 130 drives the driver 120 for attracting (guiding) the finger F of the operator from the first operation button 52a1 to the second operation button 52a2. The controller 130 generates the vibration on the operation surface 111. The controller 130 causes the driver 120 to generate the vibration that is a stationary wave in the vector direction (direction to the movement destination of the operation object) on the operation surface 111.

Here, each of the operation areas 1111 and 1112 is set to be arranged in the x-axis direction, and therefore the vector direction is the x-axis direction. The controller 130 generates the vibration along the x-axis direction.

Figure 6:
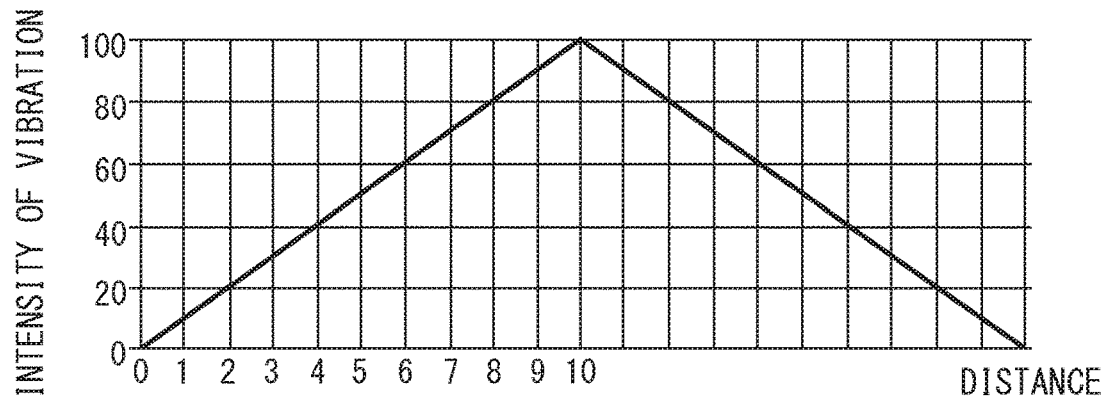
FIG. 6 is a graph showing the intensity of the vibration when a finger is attracted in the first embodiment.

As shown in FIG. 6, the controller 130 performs the control so that an intensity of the vibration is a maximum value in an area (in the middle of the intermediate area ca) between the first operation area 1111 and the second operation area 1112, in accordance with the movement position of the finger F. The controller 130 changes the intensity linearly when the intensity of the vibration is changed to the maximum value.

In the part (b) of FIG. 4, the intermediate position cp in the intermediate area ca is displayed at the center position between the first operation area 1111 and the second operation area 1112 for better understanding. The intermediate position is not limited to the center position between the areas 1111 and 1112. The intermediate position cp may be any position between the first operation area 1111 and the second operation area 1112 (can be set to an arbitrary position).

Figure 7:
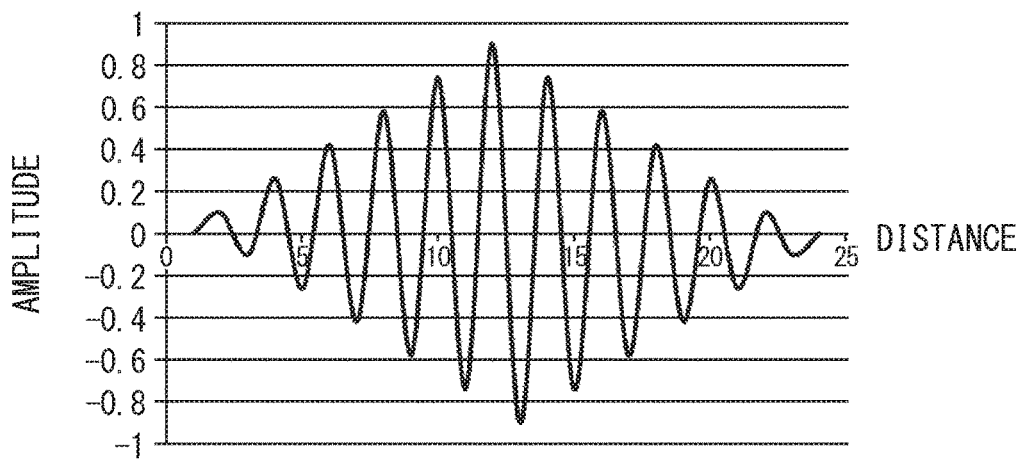
FIG. 7 is a graph showing a vibration waveform when the finger is attracted in the first embodiment.

As shown in FIG. 7, the controller 130 changes an amplitude for changing the intensity of the vibration to the maximum value. Specifically, while the finger F moves from the first operation area 1111 to the intermediate position cp, the amplitude is sequentially increased. Thereby, the intensity of the vibration is increased. The controller 130 maximizes the amplitude at the intermediate position cp. After the finger F passes the intermediate position cp, the amplitude is sequentially decreased to be returned to the original amplitude. Thereby, the intensity of the amplitude is decreased. As shown in a part (c) of FIG. 4, the change of the amplitude forms an apparent peak (mountain) and an apparent bottom (valley) of resistance on the operation surface 111. The finger F is operated (moved) as if the finger F is passing over this peak.

After S130, the controller 130 repeats the processes in S100 to S130 until the finger F of the operator is stopped in any operation area.

Due to the processes in S100 to S130, when the finger F moves from the first operation area 1111 to the second operation area 1112, the finger F receives the resistance caused by the vibration generated on the operation surface 111. In addition, as the finger F moves from the first operation area 1111 to the intermediate position cp, the intensity of the vibration is controlled to be the maximum value. Therefore, the resistance received by the finger F increases. As the finger F moves from the intermediate position cp to the second operation area 1112, the intensity of the vibration is controlled to decrease after reaching the maximum value. Therefore, the resistance received by the finger F decreases.

The finger F reaches the second operation area 1112 over the maximum resistance (peak of the part (c) of FIG. 4) at the intermediate position cp. The finger F receives a sensation (effect) as if being guided (attracted) from the intermediate position cp to the second operation area 1112. Then, the feeling of guidance may be also referred to as a feeling of climbing the peak.

In the present embodiment, when the operator moves the finger F, the finger F is guided in the movement direction, and the feeling of being guided to the movement destination is obtained.

During the repetition of S100 to S130, when determining that the movement of the finger F is stopped in S110, the controller 130 determines whether the press operation has been performed on any operation area (any operation button) in S140. The press operation is an operation indicating selection and decision of the operation area (operation button) by the operator. The press operation is performed by the operator pressing the finger at the position corresponding to the operation area (operation button) on the operation surface 111. When the determination is positive in S140, the controller 130 executes a press determination process in S150. That is, an instruction corresponding to any operation button is performed on the navigation device 50. When the determination is negative in S140, the process returns to S100.

In S160, the controller 130 generates a vibration (click feeling vibration) for providing a click feeling to the finger F of the operator. Here, the driver 120 is diverted. Unlike the vibration in S130, for example, the driver 120 is vibrated once so that the operator can recognize that the press operation has been performed.

As shown in FIG. 8, under a predetermined condition in which the stop (stagnation) of the finger F in the intermediate area ca is estimated, the vibration having the amplitude corresponding to the position is continuously generated. The attraction effect is not obtained, and also the operator feels uncomfortable.

Figure 9:
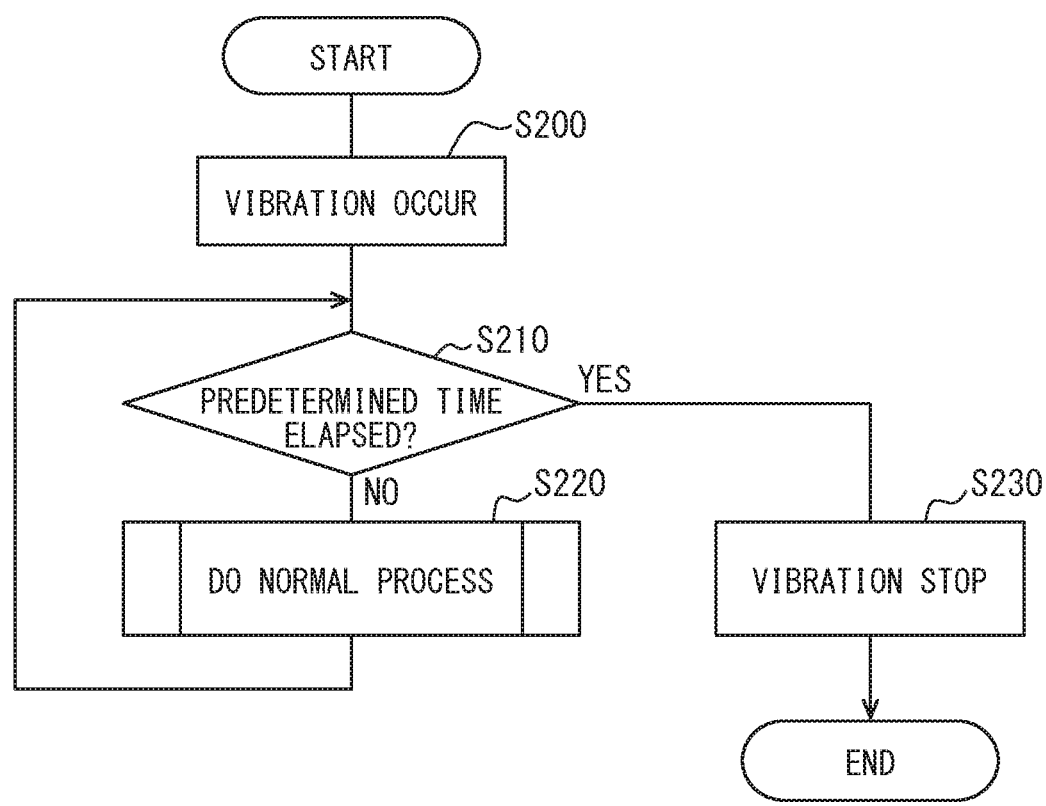
FIG. 9 is a flowchart showing a process of a vibration control when the finger stops in the first embodiment.

In the present embodiment, based on a flowchart of FIG. 9, a control (uncomfortable feeling prevention control) for preventing the continuously generated vibrations from causing the uncomfortable feeling is performed. The predetermined condition in which the stop (stagnation) of the finger F of the operator is estimated may be set to at least one of a condition in which a stay time of the finger F in the intermediate area ca exceeds a predetermined time, a condition in which a load of the finger F on the operation surface 111 exceeds a predetermined load, or a condition in which the change of the waveform of the generated vibration is not observed for a certain time or more.

When performing the vibration generation in S130 described in FIG. 5 in S200, the controller 130 determines whether the finger F is under the predetermined condition in S210. The predetermined condition in which the stop of the finger F is estimated is, here, the condition in which the stay time of the finger F in the intermediate area ca exceeds the predetermined time. When the determination is negative in S210, the controller 130 executes a normal process, that is, performs the vibration generation corresponding to the position of the finger F in S220.

However, when the determination is positive in S210, the controller 130 stops the generation of the attraction vibration in S230.

As described above, according to the present embodiment, the controller 130 stops the actuation of the driver 120 under the predetermined condition in which the stop of the finger F in the intermediate area ca is estimated. Therefore, it may be possible to prevent the predetermined vibration (vibration having the predetermined amplitude) from being continuously applied to the finger F repeatedly. It may be possible to eliminate the uncomfortable feeling of the operator.

Modification of First Embodiment

Figure 10:
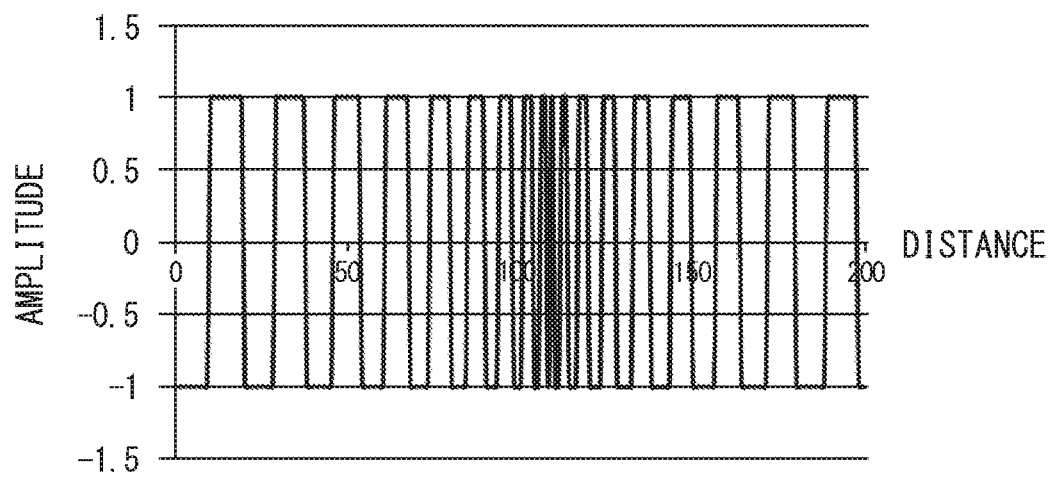
FIG. 10 is a graph showing the vibration waveform in a modification 1 of the first embodiment.
Figure 11:
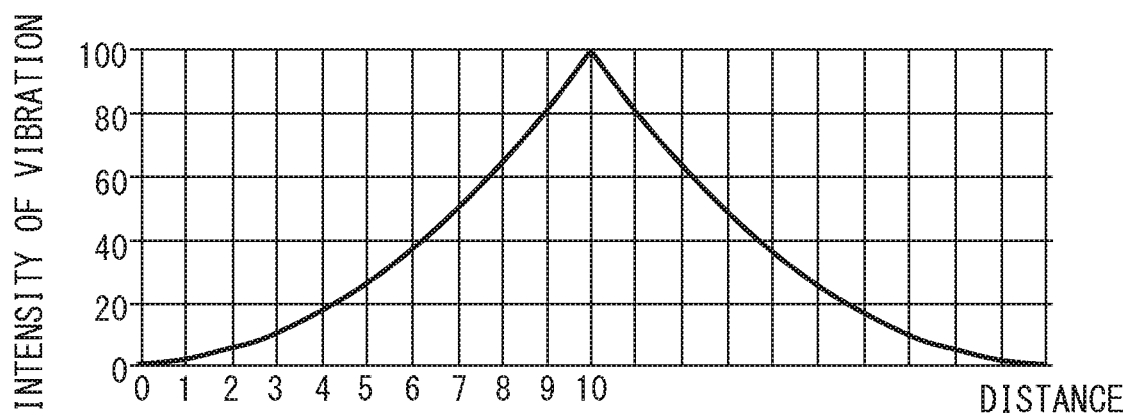
FIG. 11 is a graph showing the intensity of the vibration in a modification 2 of the first embodiment.

FIGS. 10 and 11 show a modification of the first embodiment. As shown in FIG. 10, the controller 130 changes a frequency of the vibration with the same amplitude for controlling the intensity of the vibration to be the maximum value. Specifically, while the finger F moves from the first operation area 1111 to the intermediate position cp, the frequency of the vibration is sequentially increased. Thereby, the intensity of the vibration is increased. The frequency is maximized at the intermediate position cp.

After the finger F passes the intermediate position cp, the frequency of the vibration is decreased to be returned to the original frequency. Thereby, the intensity of the vibration is decreased.

As shown in FIG. 11, when maximizing the intensity of the vibration, the controller 130 may change the intensity exponentially. According to the Weber-Fechner law, the amount of human sensation is proportional to a logarithm of a stimulus intensity. Therefore, the exponential change enables humans to more easily understand.

Second Embodiment

Figure 12:
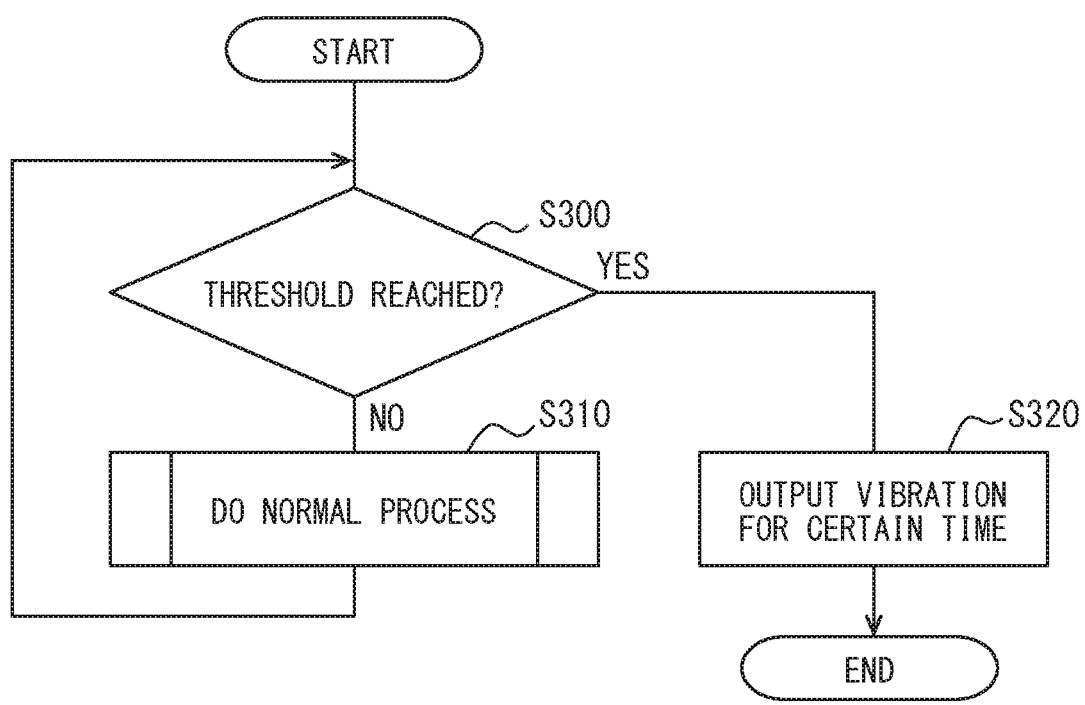
FIG. 12 is a flowchart showing a control content in a second embodiment.
Figure 13:
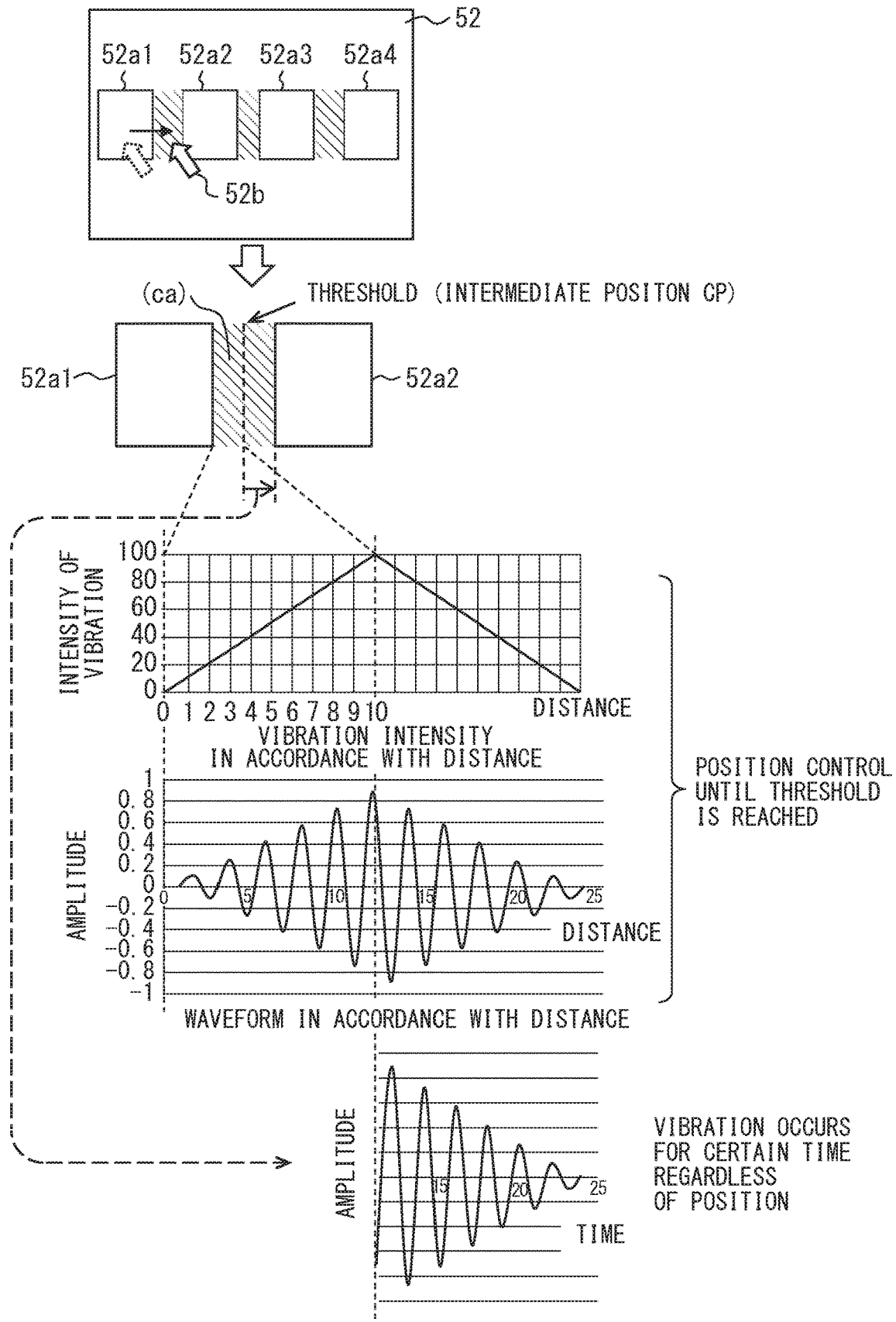
FIG. 13 is an explanatory diagram showing a control content in the second embodiment.

FIGS. 12 and 13 show a second embodiment. A configuration of the second embodiment is same as the configuration of the first embodiment, and the control content for preventing the uncomfortable feeling is changed. In the present embodiment, when the finger F moves to pass the predetermined position in the intermediate area ca, the controller 130 stops the actuation of the driver 120.

Specifically, as shown in a flowchart of FIG. 12, in S300, the controller 130 determines whether the finger F has reached the predetermined position (threshold value) in the intermediate area ca (vibration generation area). The predetermined position is, here, the intermediate position cp. When the determination is negative in S300, the controller 130 performs a normal attraction control in S310. That is, as shown in FIG. 13, the attraction vibration is generated, and the vibration is generated so that the intensity of the vibration is sequentially increased toward the threshold value (in accordance with the position of the finger F).

However, when the determination is positive in S300, the controller 130 outputs a vibration for a certain time, and stops the vibration generation in S320. Here, as shown in FIG. 13, during a certain time, the intensity of the vibration is gradually reduced, and the vibration generation is stopped.

As described above, in the present embodiment, when the finger F passes the predetermined position (for example, intermediate position cp) in the intermediate area ca, the controller 130 stops the actuation of the driver 120. Accordingly, while providing a certain degree of an attraction feeling due to the predetermined vibration, it may be possible not to provide the additional vibration to the finger F. It may be possible to prevent the operator from feeling uncomfortable. The attraction feeling may be also referred to as an attraction action or an attraction force.

The intensity of the attraction vibration is gradually decreased, and therefore it may be possible to smoothly stop the vibration. It may be possible to avoid the uncomfortable feeling due to the sudden vibration stop.

When the vibration is output for a certain time, the intensity of the vibration is constant, and the vibration may be stopped in S320.

Third Embodiment

In the first embodiment and the second embodiment, the vibration for the attraction control is a vibration that is a stationary wave in the movement direction of the finger F along the operation surface 111. Alternatively, as the vibration in a direction intersecting (perpendicular to) the operation surface 111, a perpendicular vibration (for example, with the constant vibration intensity) may be applied when the finger F enters the intermediate area ca. In this case, the perpendicular direction provides the squeeze effect, and the friction between the operation surface 111 and the finger F is reduced. When the finger F moves from the intermediate area ca to the next operation area, the attraction feeling is obtained.

Even in a case where the attraction feeling is obtained by using the squeeze effect, when the finger F stops in the middle of the intermediate area ca, the same vibration is continuously applied to the finger F, and the operator feels uncomfortable. Howe, as described in the first embodiment and the second embodiment, when the finger F is stopped or the finger F passes the predetermined position, the attraction vibration is stopped. Thereby, it may be possible to avoid the generation of the uncomfortable feeling.

Fourth Embodiment

Figure 14A:
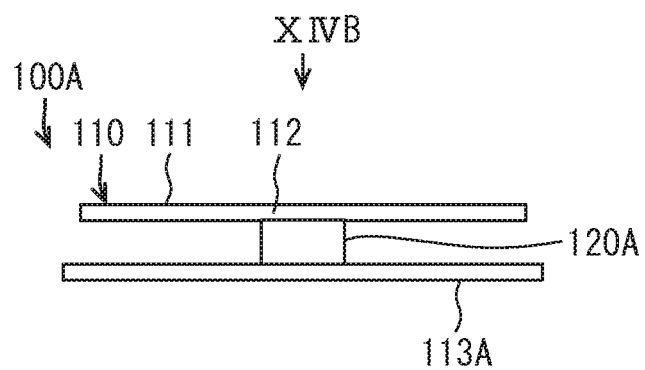
FIG. 14A is a side view showing an operation portion and a driver in a fourth embodiment.
Figure 14B:
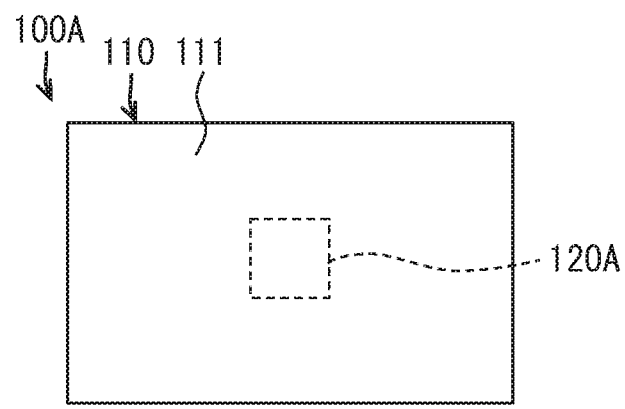
FIG. 14B is a plane view viewed from a direction of an arrow XIVB of FIG. 14A.

FIGS. 14A and 14B show an input device 100A according to a fourth embodiment. The fourth embodiment is different from the first embodiment in the setting positions of the housing 113 and the driver 120. Alternatively, the fourth embodiment includes a housing 113A and a driver 120A.

The housing 113A is formed in a plate shape, and is arranged on the back side of the operation surface 111. The driver 120A is arranged on the back side of the operation surface 111. The driver 120A is positioned between the back surface of the operation surface 111 and the housing 113A. For example, the driver 120A generates the vibrations in two axes directions corresponding to the x-axis and the y-axis. The driver 120A is placed on a central part of the back surface of the operation surface 111. As the driver 120A, for example, the electromagnetic actuator such as the voice coil motor capable of generating the vibrations in the two axis directions is used, as described in the first embodiment. The number of drivers 120A is not limited to one, and multiple drivers 120A may be used.

In the present embodiment, the basic actuation is same as that of the first embodiment. It may be possible to obtain the similar effects.

Other Embodiments

In each embodiment, it is described that the vibration control parameter (vibration map) set in advance may be used for controlling the intensity of the vibration. However, it is not limited to this. In accordance with the operation state of the finger F, the vibration pattern may be obtained by calculation for each state.

In each embodiment, the operation portion 110 is the so-called touch pad type. However, it is not limited to this. The so-called touch panel type in which the display screen 52 of the liquid crystal display 51 is transparent and the display is visually recognized in the operation surface 111 may be applicable.

In each embodiment, in S140 to S160 described in FIG. 5, when the press operation is performed, the click feeling vibration that provides the click feeling is generated. However, in the present disclosure, basically, the intensity of the vibration is maximized at the intermediate position cp between the operation areas (1111, 1112). Thereby, when the guidance force (attraction force) is generated and the finger F stops or passes the predetermined position, the attraction vibration is stopped. Accordingly, the processes in S140 to S160 may be abolished.

In each embodiment, it is described that the operation object is the finger F of the operator. However, it is not limited to this. A stick imitating a pen may be employed.

In each embodiment, an input control target (predetermined instrument) by the input device 100 or 100A is the navigation device 50. However, it is not limited to this. A different instrument such as an air conditioner for the vehicle or an audio device for the vehicle may be applicable.

The controller and the method described in the present disclosure may be implemented by a special purpose computer configuring a processor programmed to perform one or more functions embodied by a computer program. Alternatively, the controller and the method described in the present disclosure may be implemented by a special purpose computer configured as a processor with one or more special purpose hardware logic circuits. Alternatively, the controller and the method described in the present disclosure may be implemented by one or more dedicated computers configured by a combination of a processor executing a computer program and one or more hardware logic circuits. The computer program may also be stored on a computer-readable non-transitory tangible recording medium as instructions to be executed by a computer.

It is noted that a flowchart or the process of the flowchart in the present application includes multiple steps (also referred to as sections), each of which is represented, for instance, as S100. Further, each step can be divided into several sub-steps while several steps can be combined into a single step.

In the above, the embodiment, the configuration, an aspect of the input device according to the present disclosure are exemplified. However, the present disclosure is not limited to every embodiment, every configuration and every aspect related to the present disclosure. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. An input device comprising:
a detector configured to detect an operation state of an operation object on an operation surface;
a controller configured to perform an input operation on a predetermined instrument in accordance with the operation state detected by the detector; and
a driver configured to be controlled by the controller and vibrate the operation surface,
wherein:
a plurality of operation areas for operating the predetermined instrument are set on the operation surface in advance;
the plurality of operation areas include a first operation area and a second operation area;
when determining that, based on the operation state, the operation object moves from the first operation area to the second operation area, the controller is configured to apply an attraction action into the second operation area by causing the driver to generate a predetermined vibration in an intermediate area between the first operation area and the second operation area on the operation surface;
the controller is configured to stop an actuation of the driver under a predetermined condition in which a stop of the operation object in the intermediate area is estimated or when the operation object passes a predetermined position in the intermediate area;
the predetermined vibration is a stationary wave along the operation surface in a movement direction of the operation object;
a middle position of the intermediate area provides a maximum intensity of the predetermined vibration; and the predetermined condition is a condition in which change of a waveform of a generated vibration is not observed for a certain time.

2. An input device comprising:
a detector configured to detect an operation state of an operation object on an operation surface;
a controller configured to perform an input operation on a predetermined instrument in accordance with the operation state detected by the detector; and
a driver configured to be controlled by the controller and vibrate the operation surface,
wherein:
a plurality of operation areas for operating the predetermined instrument are set on the operation surface in advance;
the plurality of operation areas include a first operation area and a second operation area;
when determining that, based on the operation state, the operation object moves from the first operation area to the second operation area, the controller is configured to apply an attraction action into the second operation area by causing the driver to generate a predetermined vibration in an intermediate area between the first operation area and the second operation area on the operation surface;
the controller is configured to stop an actuation of the driver under a predetermined condition in which a stop of the operation object in the intermediate area is estimated or when the operation object passes a predetermined position in the intermediate area;
the predetermined vibration is a stationary wave along the operation surface in a movement direction of the operation object;
a middle position of the intermediate area provides a maximum intensity of the predetermined vibration; and
the operation object passes the predetermined position via the middle position of the intermediate area providing the maximum intensity.

3. The input device according to claim 1, wherein:
the predetermined condition is at least one of a condition in which a stay time of the operation object in the intermediate area exceeds a predetermined time or a condition in which a load of the operation object on the operation surface exceeds a predetermined load.

4. The input device according to claim 1, wherein:
the controller is configured to gradually decrease a vibration intensity when stopping the actuation of the driver.

5. The input device according to claim 2, wherein:
the controller is configured to gradually decrease a vibration intensity when stopping the actuation of the driver.

6. An input device comprising:
a sensor configured to detect an operation state of an operation object on an operation surface;
a controller that includes a processor configured to perform an input operation on a predetermined instrument in accordance with the operation state detected by the sensor; and
an actuator configured to be controlled by the controller and vibrate the operation surface,
wherein:
a plurality of operation areas for operating the predetermined instrument are set on the operation surface in advance;
the plurality of operation areas include a first operation area and a second operation area;
when determining that, based on the operation state, the operation object moves from the first operation area to the second operation area, the processor is configured to apply an attraction action into the second operation area by causing the actuator to generate a predetermined vibration in an intermediate area between the first operation area and the second operation area on the operation surface; and the processor is configured to stop an actuation of the actuator under a predetermined condition in which a stop of the operation object in the intermediate area is estimated or when the operation object passes a predetermined position in the intermediate area.

* * * * *